July 19, 1932.  J. L. BROWNELL  1,867,806
MOTOR VEHICLE BODY MOUNTING
Filed Aug. 11, 1930
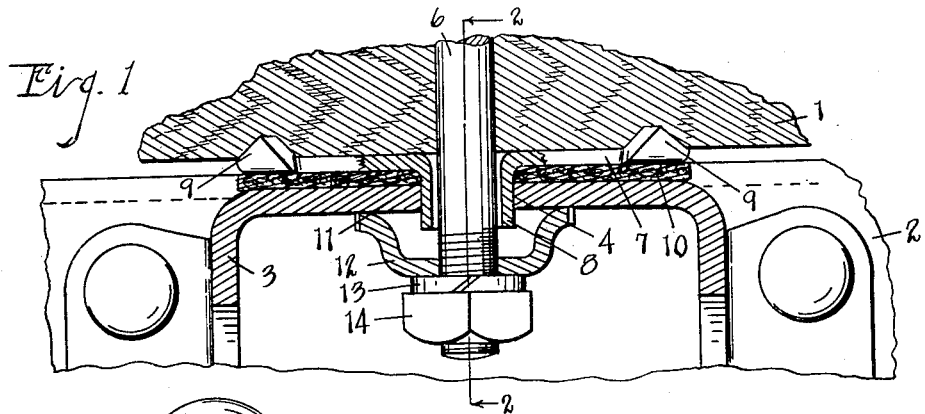
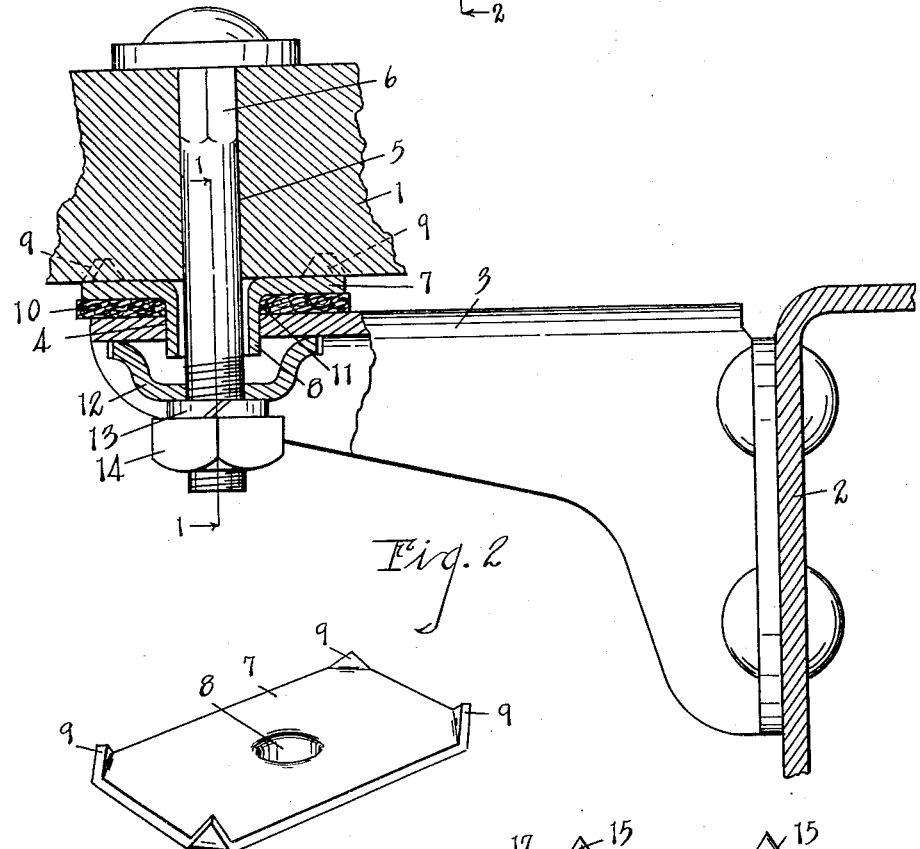
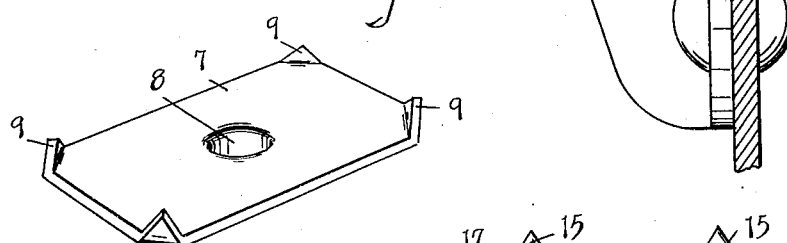
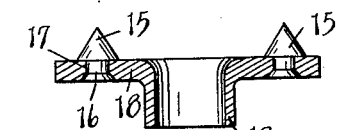
INVENTOR
James L. Brownell
BY Chappell & Earl
ATTORNEYS Patented July 19, 1932

1,867,806

UNITED STATES PATENT OFFICE

JAMES L. BROWNELL, OF KALAMAZOO, MICHIGAN, ASSIGNOR TO CHECKER CAB MANUFACTURING CORPORATION, OF KALAMAZOO, MICHIGAN

MOTOR VEHICLE BODY MOUNTING

Application filed August 11, 1930. Serial No. 474,384.

The main object of this invention is to provide a mounting or attaching means for motor vehicle bodies to the supporting chassis which is capable of withstanding very severe strains, is not likely to loosen in use, and minimizes creaking or squeaking.

Objects pertaining to details and economies of my invention will definitely appear from the description to follow. The invention is defined in the claims.

A structure which embodies the features of my invention is clearly illustrated in the accompanying drawing, in which:

Fig. 1 is a fragmentary view mainly in vertical section on line 1—1 of Fig. 2 of parts of a motor vehicle chassis and body embodying the features of my invention.

Fig. 2 is a fragmentary view mainly in section on line 2—2 of Fig. 1.

Fig. 3 is a perspective view of the attaching plate element.

Fig. 4 is a vertical section of a modified form or embodiment of the attaching plate.

In the accompanying drawing, 1 represents a sill or other frame member of a motor vehicle body and 2 represents one of the chassis side rails. The side rail has a body supporting bracket 3 mounted thereon which is provided with a hole 4 opening between the flanges thereof, the bracket being of channel cross section. The body member is provided with a hole 5 to receive the bolt 6.

I provide an attaching plate 7 having a central tubular stud 8 formed thereon which fits within the hole 4 in the bracket. The plate is provided with upturned lugs 9 which are embedded in the sill or supporting member 1, which is commonly formed of wood.

A packing 10 of felt or the like is arranged between the plate and the bracket and has a hole 11 to receive the stud 8 so that the stud serves as a means for retaining the packing.

The bolt 6 is provided with a cupped washer 12 which embraces the inner end of the lug 8 and also with spring washer 13 interposed between the cupped washer and the nut 14.

In the embodiment shown in Figs. 1 to 3 the lugs 9 are formed integrally with the plate 7. In the embodiment shown in Fig. 4 the lugs 15 are provided with rivet-like shanks 16 which are upset in openings 17 in the plate 18. This plate is provided with a tubular stud 19 corresponding to the stud 8 of the plate 7.

This provides a very secure anchoring means and one which relieves the bolts of undue strain, much of the load being taken by the attaching plate. The structure is well adapted to withstand wracking strains, and creaking and squeaking in the joints is minimized.

It is desired to point out that even when the bolt is loosened or lost the attaching plate, owing to the close engagement with the chassis member, serves as an effective support against lateral strains. In fact, the plate is designed to sustain all lateral load.

I have illustrated only such parts of a structure as seem desirable to illustrate an embodiment of my improvements. It will be understood that by improvements are capable of very wide adaptation but I have not attempted to illustrate various adaptations or embodiments as it is believed this disclosure will enable those skilled in the art to adapt the same as may be desired.

Having thus described my invention what I claim as new and desire to secure by Letters Patent is:

1. The combination of a body member having a bolt hole, a body supporting chassis element having a hole axially alined with the bolt hole in said body member, a plate having a tubular stud engaged in said hole of said chassis element and provided with projecting lugs embedded in said body member, a securing bolt arranged through said stud and the bolt hole in said body member, a felt washer disposed around said stud between said plate and said chassis element, a cupped washer on said bolt engaging said chassis element in spaced relation to said stud, and a nut on said bolt clamping said elements in assembled relation.

2. The combination of a body member having a bolt hole, a body supporting chassis element having a hole axially alined with the bolt hole in said body member, a plate having a tubular stud engaged in said hole of said chassis element and provided with projecting lugs embedded in said body member, a securing bolt arranged through said stud and the bolt hole in said body member, a washer of yieldable material disposed around said stud between said plate and said chassis element, a cupped washer on said bolt engaging said chassis element in spaced relation to said stud, and a nut on said bolt clamping said elements in assembled relation.

In witness whereof I have hereunto set my hand.

JAMES L. BROWNELL.